United States Patent
Kodama

(10) Patent No.: US 7,113,222 B2
(45) Date of Patent: Sep. 26, 2006

(54) METHOD AND APPARATUS FOR CONVERTING AN INTERLACE IMAGE TO A PROGRESSIVE IMAGE

(75) Inventor: Tomoya Kodama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 563 days.

(21) Appl. No.: 10/383,739

(22) Filed: Mar. 10, 2003

(65) Prior Publication Data

US 2003/0184676 A1 Oct. 2, 2003

(30) Foreign Application Priority Data

Mar. 27, 2002 (JP) ............................. 2002-089779

(51) Int. Cl.
H04N 7/01 (2006.01)
(52) U.S. Cl. ..................... 348/452; 348/448
(58) Field of Classification Search ............... 348/452, 348/448, 700, 581
See application file for complete search history.

(56) References Cited

U.S. PATENT DOCUMENTS 5,943,099 A * 8/1999 Kim ........................... 348/448
6,288,745 B1 * 9/2001 Okuno et al. ............... 348/448
6,414,719 B1 * 7/2002 Parikh ......................... 348/448
2002/0093587 A1 * 7/2002 Michel ........................ 348/452

OTHER PUBLICATIONS

Gerard De Haan, et al., "Deinterlacing-An Overview", Proceedings of the IEEE, vol. 86, No. 9, Sep. 1998, pp. 1837-1857.
Information Display, "Interlace-to-Progressive Conversion", The Institute of Image Information and Television Engineers, Chap 3, Sec. 2-3-4, 2001, pp. 586-589 (with English translation).

* cited by examiner

Primary Examiner—Victor R. Kostak
(74) Attorney, Agent, or Firm—Oblon, Spivak, McClelland, Maier & Neustadt, P.C.

(57) ABSTRACT

An interlace image signal is converted to a progressive image signal. It is decided whether each pixel of one of the first field and the second field is in a static area or a moving area. If a pixel of one field is in the static area, pixel data of the pixel of the one field and pixel data of a corresponding pixel of the other field are output as pixel data of the same pixels of an odd number line and an even number line in the progressive image. If a pixel of the one field is in the moving area, interpolated data of the pixel of the one field and interpolated data of a corresponding pixel of the other field are output as pixel data of the same pixels of an odd number line and an even number line in the progressive image. The interpolated data is filtered pixel data along temporal direction and spatial direction.

20 Claims, 6 Drawing Sheets

TOP FIELD   BOTTOM FIELD
———→ TIME

ONE FRAME
———→ TIME

METHOD AND APPARATUS FOR CONVERTING AN INTERLACE IMAGE TO A PROGRESSIVE IMAGE

CROSS-REFERENCE TO RELATED APPLICATIONS

This application is based upon and claims the benefit of priority from the prior Japanese Patent Application P2002-089779, filed on Mar. 27, 2002; the entire contents of which are incorporated herein by reference.

1. Field of the Invention

The present invention relates to an image scan conversion method and an apparatus for converting an interlace image to a progressive image.

2. Background of the Invention

In proportion to improvement of computer ability, an image such as television or video is often played on a computer display. In general, a television signal and a video signal are an interlace image signal. On the other hand, an image signal of the computer is a progressive image signal. Accordingly, in such application to play the image, an IP conversion method, which is a conversion from the interlace image signal to the progressive image signal, is used. The interlace image signal is different from the progressive image signal as follows.

First, as shown in FIG. 1, the interlace image signal consists of two fields each including pixels at an interval of one line (odd number line or even number).

Odd and even fields have mutually different offsets along a vertical direction of one frame. In FIG. 1, a top field consists of pixel data of odd number lines and a bottom field consists of pixel data of even number lines. One frame consists of the top field and the bottom field. Pixel data are input in order of the top field and the bottom field.

On the other hand, as shown in FIG. 2, the progressive image signal consists of one frame including pixel data of all lines (odd number lines and even number lines). One frame is constructed by merging each pixel of the top field and the bottom field. Pixel data of all pixels of each line are input in order of line position.

FIG. 3 shows a time pattern of the top field and the bottom field in the interlace image. This pattern is represented as relationship between time axis (temporal direction) and Y axis (vertical direction of frame). X axis of frame is perpendicular to FIG. 3 (X axis is not shown in FIG. 3). As shown in FIG. 3, the top field consisting of pixels of odd number lines and the bottom field consisting of pixels of even number lines are mutually input in time series.

FIG. 4 shows a time pattern of each frame in the progressive image. This pattern is represented as relationship between the time axis (temporal direction) and the Y axis (vertical direction of frame). In the same way as in FIG. 3, the X axis of the frame is perpendicular to FIG. 4 (X axis is not shown in FIG. 4). As shown in FIG. 4, each frame consisting of pixels of odd number lines and even number lines is input in time series. In comparison with FIG. 3, each frame is constructed by merging the top field and the neighboring bottom field.

In the interlace image signal shown in FIGS. 1 and 3, a time stamp of each field is shifted between the top field and the bottom field. On the other hand, in the progressive image signal shown in FIGS. 2 and 4, a time stamp of one frame is unique. Accordingly, in the interlace image signal and the progressive image signal of the same resolution and the same frame rate, a temporal resolution of the interlace image signal is higher than that of the progressive image signal, and a spatial resolution of the progressive image signal is higher than that of the interlace image signal. The "temporal resolution" is defined as the number of times of input of fields (or frames) in a predetermined period. The "spatial resolution" is defined as the number of lines included in one field (or one frame) at a predetermined timing. In other words, restriction of the temporal resolution means filtering along a temporal direction, and restriction of the spatial resolution means filtering along a spatial direction.

In case of IP (Interlaced to Progressive) conversion from one of the top field and the bottom field, it is necessary to interpolate pixel data of pixels of the other of the top field and the bottom field. FIG. 5 shows an IP conversion method (including interpolation processing) of the prior art. As shown in FIG. 5, a difference of pixel data of two pixels of the same vertical position between the present field and a prior field delayed by two field periods from the present field is calculated. In this case, if the present field is a top field, the prior field is a previous top field, and if the present field is a bottom field, the prior field is a previous bottom field. Then, an absolute value of the difference is calculated.

It is decided whether each pixel of the present field is a moving area or a static area based on the absolute value of the difference. In case of moving area, change between an image of the present field and an image of a previous field delayed by one field period from the present field occurs by moving. Accordingly, if a pixel of the present field is decided as the moving area, pixel data of corresponding pixel of the previous field is interpolated using pixel data of the decided pixel of the present field. On the other hand, if a pixel of the present field is decided as the static field, actual pixel data of corresponding pixel of the previous field is used as it is. By using this method, pixels of the moving area of the previous field are interpolated in the present field while the spatial resolution of the static area does not fall. As a result, the interlace image signal can be converted to the progressive image signal.

In AV equipment for public such as a television receiver and an image play equipment, the IP conversion is used in order to improve the spatial resolution. Concretely, the interlace image signal of sixty fields per second such as NTSC signal is converted to the progressive image signal of sixty frames per second. On the other hand, in case of displaying the interlace image on a computer monitor, the IP conversion removes flicker caused by interlace on screen. Concretely, the interlace image signal of sixty fields per second is converted to the progressive image signal of thirty frames per second. Especially, in order not to increase quantity of image data on a bus of the computer, this conversion method is often used for dynamic image processing such as MPEG decoding by software.

In case of converting the interlace image signal of sixty fields per second to the progressive image signal of thirty frames per second by above-mentioned method of IP conversion, pixel data of pixels of one field (top field or bottom field in the interlace image) are used as it is for one line (odd number line or even number line) corresponding to the one field in the progressive image. On the other hand, in the other line of the progressive image corresponding to the other field, in case of the static area, pixel data of pixels of the other field is used as it is. However, in case of the moving area, pixel data of a pixel to be used for the other line in the progressive image is interpolated irrespective of actual pixel data of the pixel of the other field. As a result, the spatial resolution falls in the progressive image.

For example, in FIG. 5, pixel data of each pixel of the top field (present field) are used for odd number line of the progressive frame. However, as for even number line of the progressive frame corresponding to the bottom field of the interlace image, in case of the moving area, pixel data is interpolated by pixel values of two pixels of the top field for the even number line. In the most simple interpolation processing, an average of pixel values of the two pixels is calculated as the interpolation value. In this interpolation processing, the spatial resolution of interpolated pixel falls and blur occurs on the progressive image.

In this way, if one line consisting of actual pixel of one field and the other line consisting of interpolated pixel of low spatial resolution are mutually located as the progressive image, distortion called combing occurs and sufficient quality is not acquired.

Furthermore, in case of converting the interlace image signal of sixty fields per second to the progressive image signal of thirty frames per second, actual pixel data of the other field of the interlace image is abandoned for the moving area. While displaying the progressive image created by this method, if an object is moving along a horizontal direction, the object of high resolution is displayed at intervals. Accordingly, a user perceives the object's moving such as time lapse and feels unnaturality.

SUMMARY OF THE INVENTION

It is an object of the present invention to provide an image scan conversion method and apparatus able to acquire the progressive image of high quality.

In accordance with the present invention, there is provided a method for converting an interlace image signal to a progressive image signal, the interlace image signal having a first field of pixel data of odd number lines and a second field of pixel data of even number lines, the progressive image signal having a frame of pixel data of odd number lines and even number lines, comprising: deciding whether each pixel of one of the first field and the second field is in a static area or a moving area; outputting, if a pixel of one field is in the static area, pixel data of the pixel of the one field and pixel data of a corresponding pixel of the other field as pixel data of the same pixels of an odd number line and an even number line in the progressive image; and outputting, if a pixel of the one field is in the moving area, interpolated data of the pixel of the one field and interpolated data of a corresponding pixel of the other field as pixel data of the same pixels of an odd number line and an even number line in the progressive image, the interpolated data being filtered pixel data along temporal direction and spatial direction.

Further in accordance with the present invention, there is also provided a method for converting an interlace image signal to a progressive image signal, the interlace image signal having a first field of pixel data of odd number lines and a second field of pixel data of even number lines, the progressive image signal having a frame of pixel data of odd number lines and even number lines, comprising: deciding whether each pixel of the first field and the second field is in a static area or a moving area; outputting, if a pixel of one field is in the static area, pixel data of the pixel of the one field as pixel data of the same pixel of one line corresponding to the one field in the progressive image; and outputting, if a pixel of one field is in the moving area, interpolated data of the pixel of the one field as pixel data of same pixel of the one line corresponding to the one field in the progressive image, the interpolated data being filtered pixel data along temporal direction and spatial direction.

Further in accordance with the present invention, there is also provided an apparatus for converting an interlace image signal to a progressive image signal, the interlace image signal having a first field of pixel data of odd number lines and a second field of pixel data of even number lines, the progressive image signal having a frame of pixel data of odd number lines and even number lines, comprising: a decision unit configured to decide whether each pixel of one of the first field and the second field is in a static area or a moving area; a first output unit configured to output, if a pixel of one field is in the static area, pixel data of the pixel of the one field and pixel data of a corresponding pixel of the other field as pixel data of the same pixels of an odd number line and an even number line in the progressive image; and a second output unit configured to output, if a pixel of the one field is in the moving area, interpolated data of the pixel of the one field and interpolated data of a corresponding pixel of the other field as pixel data of the same pixels of an odd number line and an even number line in the progressive image, the interpolated data being filtered pixel data along temporal direction and spatial direction.

Further in accordance with the present invention, there is also provided an apparatus for converting an interlace image signal to a progressive image signal, the interlace image signal having a first field of pixel data of odd number lines and a second field of pixel data of even number lines, the progressive image signal having a frame of pixel data of odd number lines and even number lines, comprising: a decision unit configured to decide whether each pixel of the first field and the second field is in a static area or a moving area, a first output unit configured to output, is a pixel of one field is in the static area, pixel data of the pixel of the one field as pixel data of the same pixel of one line corresponding to the one field in the progressive image; and a second output unit configured to output, if a pixel of one field is in the moving area, interpolated data of the pixel of the one field as pixel data of the same pixel of one line corresponding to the one field in the progressive image, the interpolated data being filtered pixel data along temporal direction and spatial direction.

Further in accordance with the present invention, there is also provided a computer program product, comprising: a computer readable program code embodied in said product for causing a computer to convert an interlace image signal to a progressive image signal, the interlace image signal having a first field of pixel data of odd number lines and a second field of pixel data of even number lines, the progressive image signal having a frame of pixel data of odd number lines and even number lines, said computer readable program code comprising: a first program code to decide whether each pixel of one of the first field and the second field is in a static area or a moving area; a second program code to output, if a pixel of one field is in the static area, pixel data of the pixel of the one field and pixel data of a corresponding pixel of the other field as pixel data of the same pixels of an odd number line and an even number line in the progressive image; and a third program code to output, if a pixel of the one field is in the moving area, interpolated data of the pixel of the one field and interpolated data of a corresponding pixel of the other field as pixel data of the same pixels of an odd number line and an even number line in the progressive image, the interpolated data being filtered pixel data along temporal direction and spatial direction.

Further in accordance with the present invention, there is also provided a computer program product, comprising: a computer readable program code embodied in said product for causing a computer to convert an interlace image signal to a progressive image signal, the interlace image signal having a first field of pixel data of odd number lines and a second field of pixel data of even number lines, the progressive image signal having a frame of pixel data of odd number lines and even number lines, said computer readable program code comprising: a first program code to decide whether each pixel of the first field and the second field is in a static area or a moving area; a second program code to output, if a pixel of one field is in the static area, pixel data of the pixel of the one field as pixel data of the same pixel of one line corresponding to the one field in the progressive image; and a third program code to output, if a pixel of one field is in the moving area, interpolated data of the pixel of the one field as pixel data of the same pixel of one line corresponding to the one field in the progressive image, the interpolated data being filtered pixel data along temporal direction and spatial direction.

Further in accordance with the present invention, there is also provided a method for converting an interlace image having a first and second field images into a progressive image having a frame image, comprising: receiving a series of pixel data of the first and second field images; calculating a first interpolated pixel data from a pair of neighboring pixel data in the first field image; calculating a difference of the first interpolated pixel data and a corresponding pixel data in the second field image; and generating a first frame pixel data for the frame image by interpolating the first interpolated pixel data and the corresponding pixel data in the second field image when the difference is larger than a threshold value, wherein the first frame pixel data is obtained from the corresponding pixel data in the second field image when the difference is not larger than the threshold value.

DETAILED DESCRIPTION OF THE INVENTION

Figure 1:
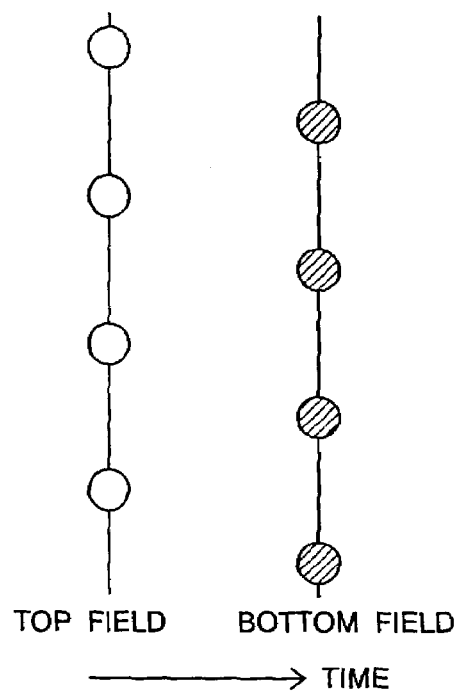
FIG. 1 is a schematic diagram of an interlace image signal.
Figure 2:
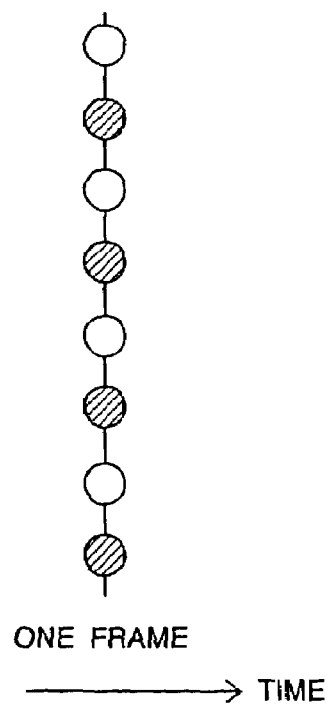
FIG. 2 is a schematic diagram of a progressive image signal.
Figure 3:
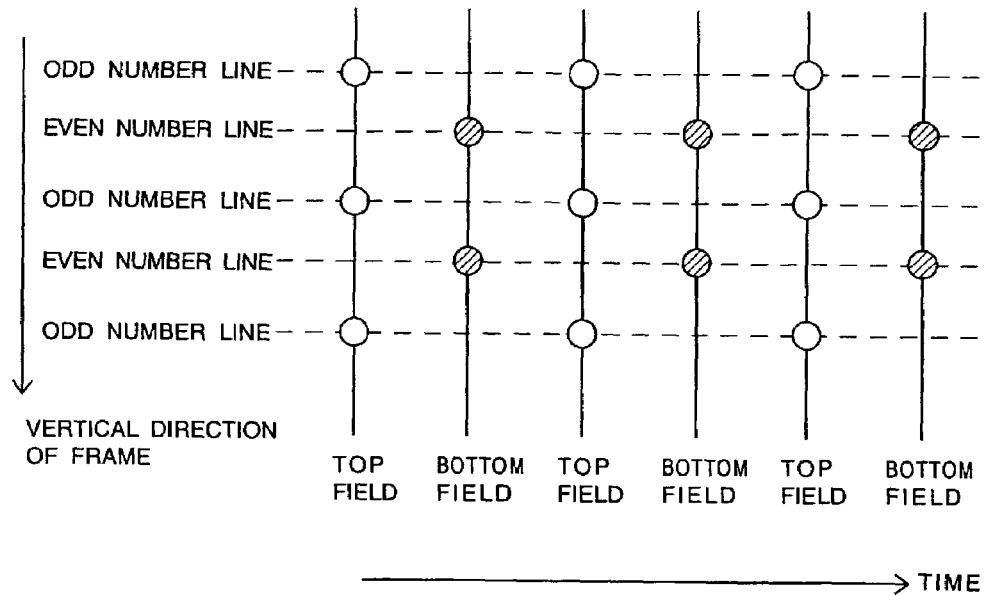
FIG. 3 is a schematic diagram of a plurality of interlace image signal in time series.
Figure 4:
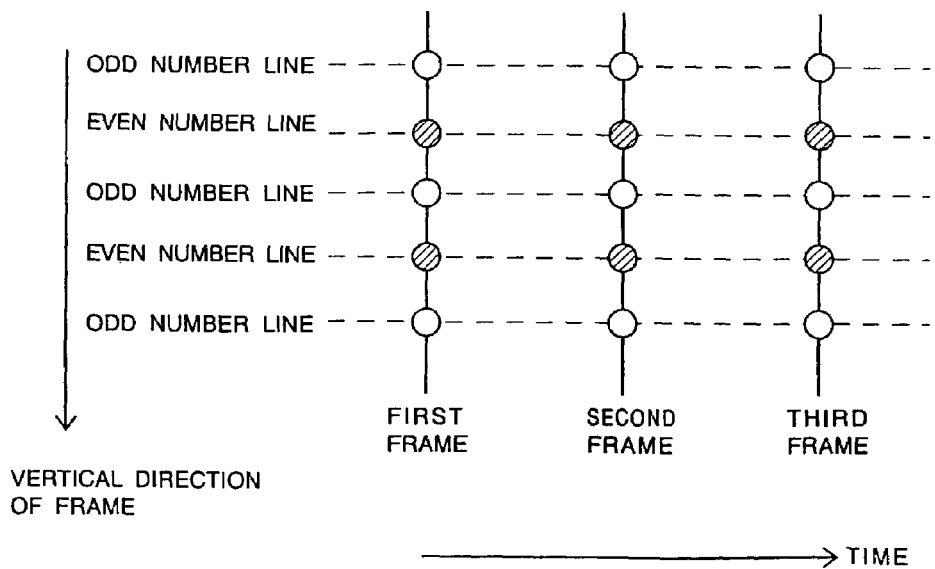
FIG. 4 is a schematic diagram of a plurality of progressive image signals in time series.
Figure 5:
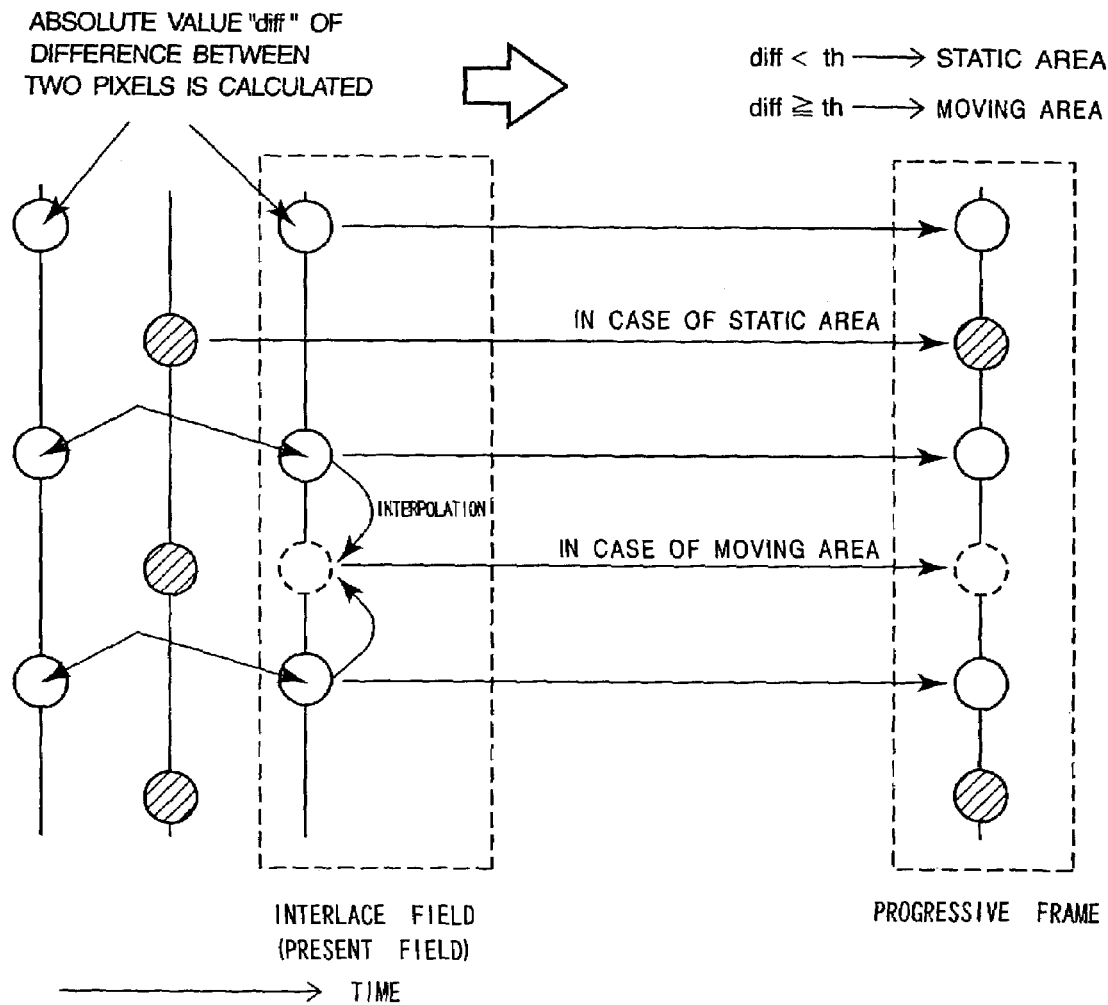
FIG. 5 is a schematic diagram to explain an IP conversion method according to the prior art.

Hereinafter, various embodiments of the present invention will be explained by referring to the drawings.

Figure 6:
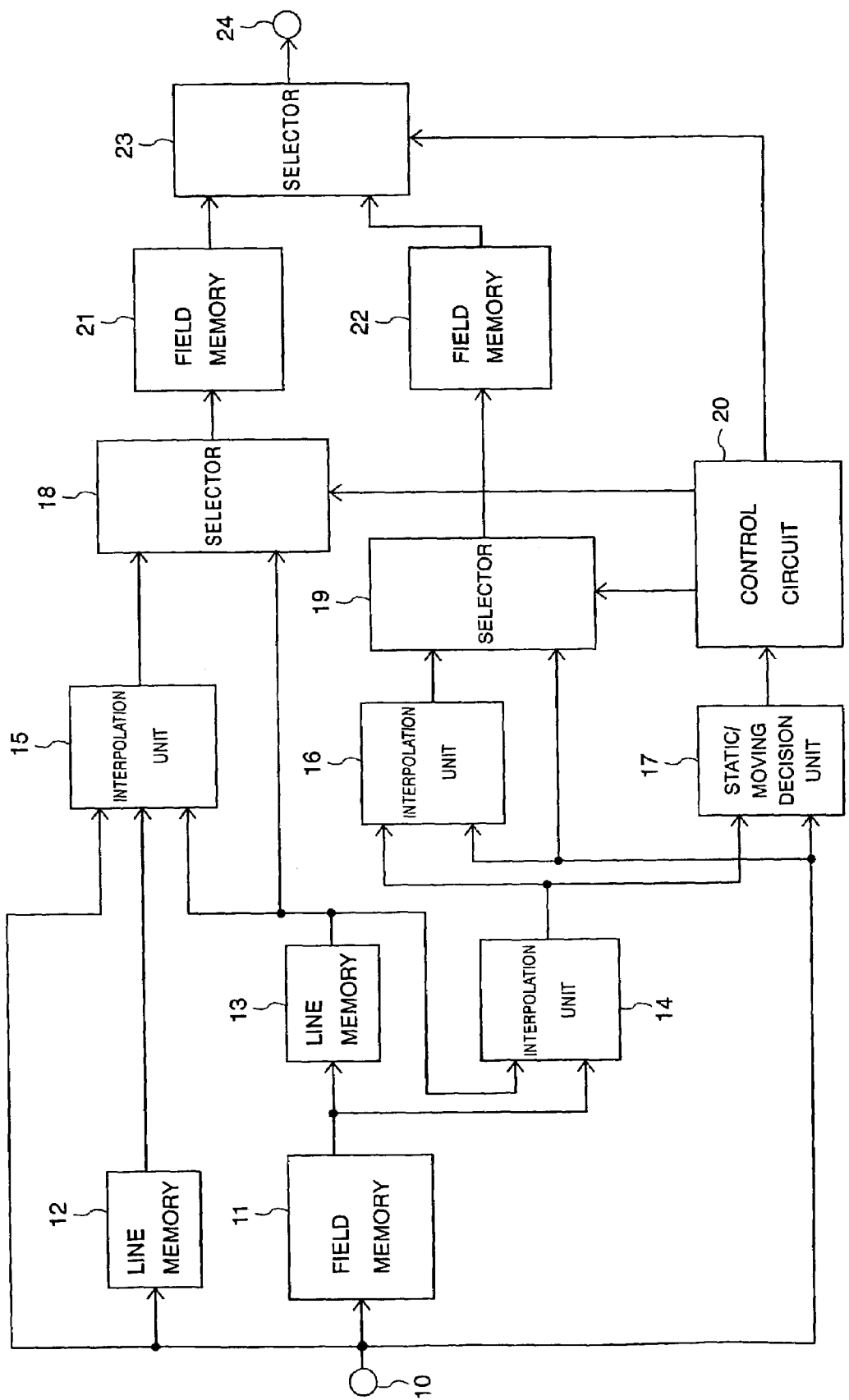
FIG. 6 is a block diagram of the image scan conversion apparatus according to a first embodiment of the present invention.

FIG. 6 is a block diagram of an image scan conversion apparatus (IP conversion apparatus) according to a first embodiment of the present invention. The interlace image signal is input to an input terminal 10. The interlace image signal is delayed by one field period by a (first) field memory 11 and delayed by one line period by a (first) line memory 12. The output signal from the first field memory 11 is input to a (second) line memory 13 and further delayed by one line period.

A (first) interpolation unit 14 inputs output signals from the first field memory 11 and the second line memory 13, and interpolates pixel data of a bottom field at a previous timing of one field period. A (second) interpolation unit 15 inputs an interlace image signal from the input terminal 10 and output signals from the first line memory 12 and the second line memory 13, and creates interpolation pixel data of odd number line of a progressive image signal. A (third) interpolation unit 16 inputs the interlace image signal from the input terminal 10 and an output signal from the first interpolation unit 14, and creates interpolation pixel data of even number line of the progressive image signal.

A static/moving decision unit 17 detects any motion of each pixel of the bottom field by calculating the difference between the interlace image signal from the input terminal 10 and an output signal from the first interpolation unit 14, and decides whether each pixel of the bottom field is a moving area or a static area. The decision result of the static/moving decision unit 17 is input to a control circuit 20. The control circuit 20 controls a (first) selector 18, a (second) selector 19, and a (third) selector 23.

If a pixel of the bottom field is decided as a static area, the first selector 18 selects an output signal from the second line memory 13 as pixel data of odd number line of the progressive image signal. If a pixel of the bottom field is decided as the moving area, the first selector 18 selects an output signal from the second interpolation unit 15 as pixel data of odd number line of the progressive image signal.

Furthermore, if a pixel of the bottom field is decided as the static area, the second selector 19 selects the interlace image signal from the input terminal 10 as pixel data of even number line of the progressive image signal. If a pixel of the bottom field is decided as the moving area, the second selector 19 selects an output signal from the second interpolation unit 16 as pixel data of even number line of the progressive image signal.

Pixel data of odd number line and even number line of the progressive image signal selected by the first selector 18 and the second selector 19 are respectively input to a (second) field memory 21 and a (third) field memory 22. Output signals from the second field memory 21 and the third field memory 22 are input to the third selector 23. The third selector 23 is controlled to select the output signals of each line from the second field memory 21 and the third field memory 22 by the control circuit 20. An output signal from the third selector 23 is supplied to an output terminal 24 as the progressive image signal.

Figure 7:
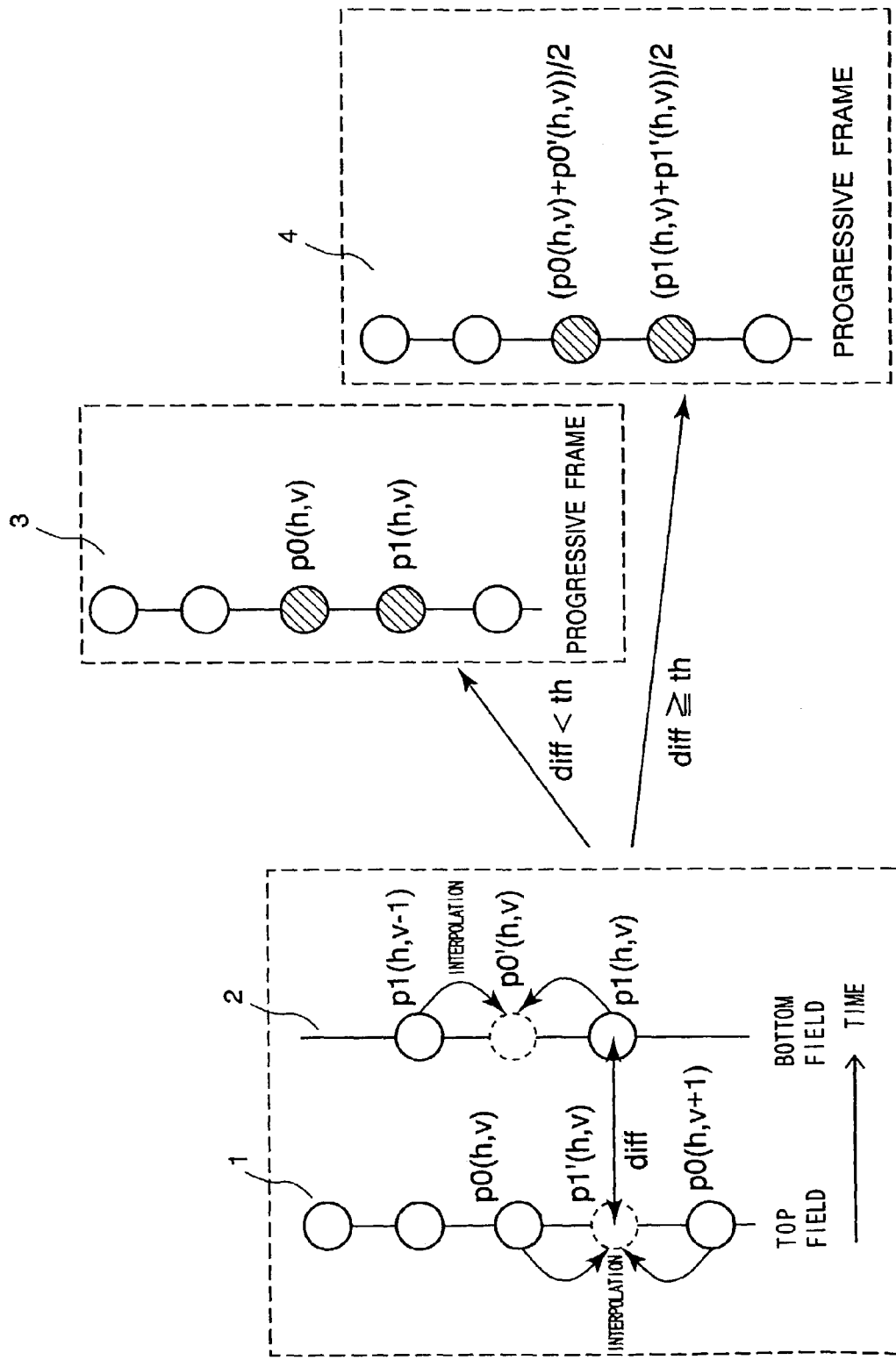
FIG. 7 is a schematic diagram to explain an IP conversion method according to the first embodiment of the present invention.

Next, operation of IP conversion apparatus of the first embodiment of the present invention is explained by referring to FIG. 7. Assume that pixel data of one field of a top field 1 of the interlace image signal is stored in the first field memory 11, and pixel data of a bottom field 2 of the interlace image signal is input to the input terminal 10. At a timing when the pixel data of the top field 1 is stored in the first field memory 11 and the pixel data of the bottom field 2 of the interlace image signal is input to the input terminal 10, each unit except for the second field memory 21, the third field memory 22 and the third selector 23, is not operated.

In the progressive image signal output from the IP conversion apparatus of the present invention, the output signal from the second field memory 21 is used as odd number line corresponding to the top field of the interlace image signal, and the output signal from the third field memory 22 is used as even number line corresponding to the bottom field of the interlace image signal. The output signals from the second field memory 21 and the third field memory 22 are mutually output as odd number line and even number line of the progressive image.

In the output operation of the progressive image signal of the present invention, motion adaptive processing is executed based on moving detection of the static/moving decision unit 17 in order to accomplish high quality of the progressive image. In correspondence with a pixel decided as the static area, pixel data of the top field 1 from the second line memory 13 is output as pixel data of odd number line of the progressive image signal, and pixel data of the bottom field 2 from the input terminal 10 is output as pixel data of even number line of the progressive image signal. On the other hand, in correspondence with a pixel decided as the moving area, pixel data of which spatial resolution and temporal resolution are restricted are output as pixel data of odd number line and even number line of the progressive image signal. Hereinafter, this processing is explained in detail.

As shown in FIG. 7, assume that pixel data of the top field 1 is represented as "P0(h,v)" and pixel data of the bottom field 2 is represented as "P1(h,V)". In this case, "h" represents a coordinate value along a horizontal axis and "v" represents a coordinate value along a vertical axis. As shown in FIG. 1, each pixel of the top field 1 and the bottom field 2 is respectively arranged by mutually shifting one pixel along a vertical direction. Pixel data of the top field 1 from the first field memory 11 is delayed by one line period by the second line memory 13. If pixel data output from the second line memory 13 is represented as P0(h,v), pixel data output from the first field memory 11 is represented as P0(h,v+1) as data passed one line period from P0(h,v). Based on pixel data P0(h,v) output from the second line memory 13 and pixel data P0(h,v+1) output from the first field memory 11, the first interpolation unit 14 estimates pixel data P1'(h,v) of the bottom field 2 at a timing of the top field 1. This pixel data P1'(h,v) is calculated as an average value of pixel data P0(h,v) and P0(h,v+1) as follows.

$$P1'(h, v) = \frac{P0(h, v) + P0(h, v + 1)}{2} \quad (1)$$

The static/moving decision unit 17 calculates an absolute value |P1(h,v)−P1'(h,v)| of the difference between pixel data P1'(h,v) of the bottom field 2 estimated by the first interpolation unit 14 and actual pixel data P1(h,v) of the bottom field 2 of the interlace image signal from the input terminal 10. Decision whether actual pixel data P1(h,v) of the bottom field 2 belongs to the moving area or the static area is executed based on the absolute value of a difference result as follows.

|P1(h,v)−P1'(h,v)|<th→P1(h,v):static area

|P1(h,v)−P1'(h,v)|≧th→P1(h,v):moving area (2)

In above condition expression (2), "th" is a threshold (constant). Concretely, if the absolute value |P1(h,v)−P1'(h,v)| of difference is below the threshold "th", pixel data P1(h,v) of the bottom field 2 is decided as the static area. If the absolute value is not below the threshold, the pixel data is decided as the moving area.

Pixel data of even number line of the progressive image signal is created as follows. First, if pixel data P1(h,v) of the bottom field 2 is decided as the static area, the second selector 19 selects pixel data P1(h,v) of the bottom field 2 as pixel data of even number line of the progressive image. On the other hand, if pixel data P1(h,v) of the bottom field 2 is decided as the moving area, the second selector 19 selects an interpolated pixel data P1"(h,v) (as explained later) output from the third interpolation unit 16 as pixel data of even number line of the progressive image. The pixel data of even number line selected by the second selector 19 is stored in the third field memory 22. The third interpolation unit 16 creates the interpolated pixel data P1"(h,v) of even number line of the progressive image signal by using actual pixel data P1(h,v) of the bottom field 2 of the interlace image signal from the input terminal 10 and interpolated pixel data P1'(h,v) of the bottom field 2 at a timing of the top field 1 from the first interpolation unit 14. The interpolation processing by the third interpolation unit 16 is executed as follows.

$$P1''(h, v) = \frac{P1(h, v) + P1'(h, v)}{2} \quad (3)$$
$$= \frac{2 \cdot P1(h, v) + P0(h, v) + P0(h, v + 1)}{4}$$

In this case, pixel data P1'(h,v) is an average value of pixel data P0(h,v) and P0(h,v+1) of neighboring two pixels of the top field 1 as shown in expression (1). Briefly, P1'(h,v) is pixel data estimated by interpolation in the top field 1 (intra-field interpolation), and spatial resolution is restricted. On the other hand, interpolated pixel data P1"(h,v) is average value of actual pixel data P1(h,v) of the bottom field 2 and the interpolated pixel data P1'(h,v) estimated from neighboring two pixel data P0(h,v) and P0(h,v+1) of the top field 1. Briefly, the interpolated pixel data P1'(h,v) is calculated by linearly combining the interpolated pixel data P1'(h,v) with actual pixel data P1(h,v) of the bottom field, and temporal resolution is restricted. Accordingly, the interpolated pixel data P1"(h,v) are data of which the spatial resolution and the temporal resolution are restricted.

On the other hand, pixel data of odd number line of the progressive image signal are created as follows. The decision result of the static/moving decision unit 17 is used for not only the bottom field side to create pixel data of even number line but also the top field side to create pixel data of odd number line. Concretely, if pixel data P1(h,v) of the bottom field 2 is decided as the static area, the first selector 18 selects pixel data P0(h,v) of the top field 1 from the second line memory 13 as pixel data of odd number line of the progressive image. If pixel data P1(h,v) of the bottom field 2 is decided as the moving area, the first selector 18 selects interpolated pixel data P1"(h,v) from the second interpolation unit 15 as pixel data of odd number line of the progressive image. The pixel data of odd number line selected by the first selector 18 are stored in the second field memory 21. In this case, if pixel data of the bottom field 2 of the interlace image signal from the input terminal 10 is P1(h,v), pixel data output from the first line memory 12 are represented as P1(h,v−1). Furthermore, as mentioned-above, pixel data P0(h,v) of the top field 1 are output from the second line memory 13.

The second interpolation unit 15 creates interpolated pixel data P0"(h,v) of odd line number of the progressive image signal by using pixel data P0(h,v) of the top field 1 from the second line memory 13, pixel data P1(h,v) of the bottom field 2 from the input terminal 10 and pixel data P1(h,v−1) of the bottom field 2 from the first line memory 12 as follows.

$$P0''(h, v) = \frac{P0(h, v) + P0'(h, v)}{2} \quad (4)$$
$$= \frac{2 \cdot P0(h, v) + P1(h, v \cdot 1) + P1(h, v)}{4}$$

The expression (4) represents that pixel data of the top field and pixel data of the bottom field are replaced in the expression (3) of the third interpolation unit 16. Accordingly, in the expression (4), interpolated pixel data P0''(h,v) are data of which spatial resolution and temporal resolution are restricted for actual pixel data P0(h,v).

In this way, pixel data of odd number line and even number line of the progressive image signal are respectively stored in the second field memory 21 and the third field memory 22. Then, the second selector 23 mutually reads out pixel data of one line from the second field memory 21 and the third field memory 22 based on control signal from the control circuit 20, and supplies the progressive image signal to the output terminal 24.

As mentioned-above, in the first embodiment, the progressive image including the moving area consisting of odd number line and even number line of the same spatial resolution is created while spatial resolution of the static area is raised in the progressive image. As a result, generation of combing is suppressed. Furthermore, processing to fall the temporal resolution is executed for the moving area. Accordingly, in case of IP conversion from the interlace image of sixty fields per second to the progressive image of thirty frames per second, the progressive image which a user cannot feel unnaturality of the object's moving is acquired.

Figure 8:
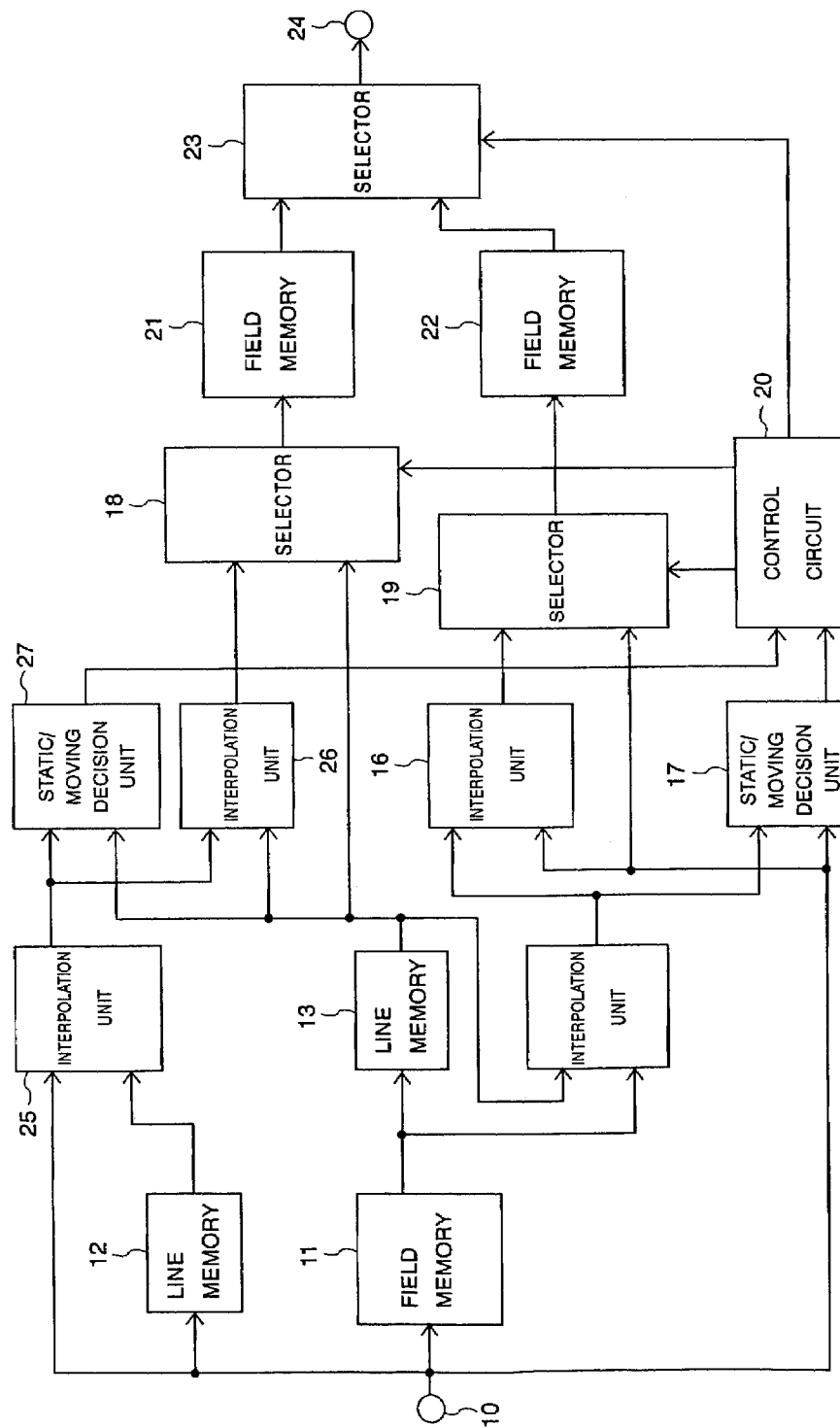
FIG. 8 is a block diagram of the image scan conversion apparatus according to a second embodiment of the present invention.

FIG. 8 is a block diagram of the IP conversion apparatus according to the second embodiment of the present invention. In comparison with the first embodiment of FIG. 6, the same sign is assigned to the same unit in FIG. 8. However, feature that static/moving decision based on moving detection is respectively executed for the top field and the bottom field is different from the first embodiment. Accordingly, in the second embodiment, instead of the second interpolation unit 15 in FIG. 6, a (fourth) interpolation unit 25, a (fifth) interpolation unit 26, and a static/moving decision unit 27, are additionally included.

In the fourth interpolation unit 25, pixel data P0'(h,v) of the top field 1 is estimated at a timing of the bottom field 2 by using pixel data P1(h,v) from the input terminal 10 and pixel data P1(h,v−1) from the first line memory 12. The pixel data P0'(h,v) is calculated as an average value of actual pixel data P1(h,v) and P1(h,v−1) as follows.

$$P0'(h, v) = \frac{P1(h, v) + P1(h, v \cdot 1)}{2} \quad (5)$$

The static/moving decision unit 27 calculates an absolute value |P0(h,v)−P0'(h,v)| of the difference between interpolated pixel data P0'(h,v) from the fourth interpolation unit 25 and actual pixel data P0(h,v) of the top field 1 from the second line memory 13. Decision whether the actual pixel data P0(h,v) of the top field 1 belongs to the moving area or the static area is executed based on the absolute value of the difference as follows.

|P0(h,v)−P0'(h,v)|<th→P0(h,v):static area

|P0(h,v)−P0'(h,v)|≧th→P0(h,v):moving area (6)

Briefly, in the static/moving decision unit 27, if the absolute value |P0(h,v)−P0'(h,v)| is below a threshold "th", pixel data P0(h,v) of the top field 1 is decided as the static area. If the absolute value is not below the threshold, the pixel data P0(h,v) is decided as the moving area.

In a (fifth) interpolation unit 26, interpolated pixel data P0''(h,v) of odd number line of the progressive image signal is created by pixel data P0(h,v) of the top field 1 from the second line memory 13 and interpolated pixel data P0'(h,v) of the top field 1 at a timing of the bottom field 2 from the fourth interpolation unit 25 as follows.

$$P0''(h, v) = \frac{P0(h, v) + P0'(h, v)}{2} \quad (7)$$

In the above expression (7), pixel data P0'(h,v) is an average value of pixel data P1(h,v) and P1(h,v−1) of neighboring two pixels of the bottom field 2 as shown in equation (5). Accordingly, spatial resolution is restricted in the pixel data P0'(h,v). On the other hand, interpolated pixel data P0''(h,v) is an average value of actual pixel data P0(h,v) of the top field 1 and interpolated pixel data P0'(h,v) interpolated from pixel data P1(h,v) and P1(h,v−1) of neighboring two pixels of the bottom field 2. Accordingly, temporal resolution is restricted in the interpolated pixel data P0''(h, v). As a result, the interpolated pixel data P0''(h,v) are data of which the spatial resolution and the temporal resolution are restricted.

In this way, in the second embodiment, processing of the top field and processing of the bottom field are symmetrical in the interlace image signal. Accordingly, by deciding whether all pixels of the frame are the static area or the moving area, more precise interpolated pixel data can be created based on the decision result.

In the first and second embodiments, examples of the IP conversion processing executed by a hardware apparatus are explained. However, the same IP conversion processing can be also executed by software using a computer. Especially, the IP conversion processing of the present invention is independent processing of each pixel. Accordingly, in case of executing IP conversion by SIMD (Single Instruction Multiple Data) type processor, pixel data of a plurality of pixels along a horizontal direction (X axis) of each line of the frame are simultaneously executed. As a result, high processing can be realized.

As mentioned-above, in the present invention, while high resolution is maintained in the static area of the progressive image, spatial resolution and temporal resolution of each line are restricted in the moving area of the progressive image. As a result, image deterioration because of combing is suppressed. Furthermore, unnaturality of moving occurred by IP conversion from sixty fields per second to thirty frames per second is suppressed.

For embodiments of the present invention, the processing of the present invention can be accomplished by computer-executable program, and this program can be realized in a computer-readable memory device.

In embodiments of the present invention, the memory device, such as a magnetic disk, a floppy disk, a hard disk, an optical disk (CD-ROM, CD-R, DVD, and so on), an optical magnetic disk (MD, and so on) can be used to store instructions for causing a processor or a computer to perform the processes described above.

Furthermore, based on an indication of the program installed from the memory device to the computer, OS (Operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

In embodiments of the present invention, the computer executes each processing stage of the embodiments according to the program stored in the memory device. The computer may be one apparatus such as a personal computer or a system in which a plurality of processing apparatuses are connected through the network. Furthermore, in the present invention, the computer is not limited to the personal computer. Those skilled in the art will appreciate that a computer includes a processing unit in an information processor, a microcomputer, and so on. In short, the equipment and the apparatus that can execute the functions in embodiments of the present invention using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method for converting an interlace image signal to a progressive image signal, the interlace image signal having a first field of pixel data of odd number lines and a second field of pixel data of even number lines, the progressive image signal having a frame of pixel data of odd number lines and even number lines, comprising:
   calculating a difference of pixel data between a pixel of one field and a corresponding pixel of a previous one field, the one field being the first field or the second field;
   deciding whether the pixel of the one field is in a static area or a moving area based on the difference;
   outputting, if the pixel of the one field is in the static area, pixel data of the pixel of the one field and pixel data of a corresponding pixel of the other field as pixel data of the same pixels of an odd number line and an even number line in the progressive image; and
   outputting, if the pixel of the one field is in the moving area, interpolated data of the pixel of the one field and interpolated data of a corresponding pixel of the other field as pixel data of the same pixels of an odd number line and an even number line in the progressive image, the interpolated data being filtered pixel data along a temporal direction and a spatial direction.

2. The method according to claim 1, at the deciding step, further comprising:
   deciding, if the difference is below a threshold, that the pixel is in the static area, and
   deciding, if the difference is not below the threshold, that the pixel is in the moving area.

3. The method according to claim 1, at the first outputting step, further comprising:
   outputting the pixel data of a decided pixel of the one field as pixel data of the same pixel of one of an odd number line and an even number line corresponding to the one field in the progressive image.

4. The method according to claim 3, further comprising:
   outputting the pixel data of a pixel of the other field corresponding to the decided pixel as pixel data of the same pixel of the other of an odd number line and an even number line in the progressive image.

5. The method according to claim 1, at the second outputting step, further comprising:
   linearly combining the pixel data of a decided pixel of one field with pixel data of an interpolated pixel of the other field, the pixel data of the interpolated pixel being calculated using pixel data of two pixels of the other field to which the decided pixel is nearest in the interlace image, and combined pixel data being the interpolated data of the decided pixel of the one field.

6. The method according to claim 5, further comprising:
   outputting the interpolated data as pixel data of the same pixel of one of an odd number line and an even number line corresponding to the one field in the progressive image.

7. The method according to claim 6, further comprising:
   linearly combining the pixel data of a pixel of the other field corresponding to the decided pixel with pixel data of an interpolated pixel of the one field, the pixel data of the interpolated pixel being calculated using the pixel data of the decided pixel and a neighboring pixel of the one field, and combined pixel data being the interpolated data of the corresponding pixel of the other field.

8. The method according to claim 7, further comprising:
   outputting the interpolated data as pixel data of the same pixel of the other of an odd number line and an even number line in the progressive image.

9. A method for converting an interlace image signal to a progressive image signal, the interlace image signal having a first field of pixel data of odd number lines and a second field of pixel data of even number lines, the progressive image signal having a frame of pixel data of odd number lines and even number lines, comprising:
   calculating a difference of pixel data between a pixel of one field and a corresponding pixel of a previous one field, the one field being the first field and the second field;
   deciding whether the pixel of the one field is in a static area or a moving area based on the difference;
   outputting, if the pixel of one field is in the static area, pixel data of the pixel of the one field as pixel data of the same pixel of one line corresponding to the one field in the progressive image; and
   outputting, if the pixel of one field is in the moving area, interpolated data of the pixel of the one field as pixel data of the same pixel of one line corresponding to the one field in the progressive image, the interpolated data being filtered pixel data along a temporal direction and a spatial direction.

10. The method according to claim 9, at the deciding step, further comprising:
    deciding, if the difference is below a threshold, that the pixel is in the static area, and deciding, if the difference is not below the threshold, that the pixel is in the moving area.

11. The method according to claim 9, at the first outputting step, further comprising:

outputting the pixel data of the pixel of the first field as pixel data of the same pixel of an odd number line in the progressive image, and outputting the pixel data of the pixel of the second field as pixel data of the same pixel of an even number line in the progressive image.

12. The method according to claim 9, at the second outputting step, further comprising:

linearly combining the pixel data of a decided pixel of one field with pixel data of an interpolated pixel of the other field, the pixel data of the interpolated pixel being calculated using pixel data of two pixels of the other field to which the decided pixel is nearest in the interlace image, and combined pixel data being the interpolated data of the decided pixel of the one field.

13. The method according to claim 12, further comprising:

outputting, if the one field is the first field, the interpolated data as pixel data of the same pixel of an odd number line in the progressive image.

14. The method according to claim 13, further comprising:

outputting, if the one field is the second field, the interpolated data as pixel data of the same pixel of an even number line in the progressive image.

15. An apparatus for converting an interlace image signal to a progressive image signal, the interlace image signal having a first field of pixel data of odd number lines and a second field of pixel data of even number lines, the progressive image signal having a frame of pixel data of odd number lines and even number lines, comprising:

a decision unit configured to calculate a difference of pixel data between a pixel of one field and a corresponding pixel of a previous one field, the one field being the first field or the second field, and to decide whether the pixel of the one field is in a static area or a moving area based on the difference;

a first output unit configured to output, if the pixel of the one field is in the static area, pixel data of the pixel of the one field and pixel data of a corresponding pixel of the other field as pixel data of the same pixels of an odd number line and an even number line in the progressive image; and a second output unit configured to output, if the pixel of the one field is in the moving area, interpolated data of the pixel of the one field and interpolated data of a corresponding pixel of the other field as pixel data of the same pixels of an odd number line and an even number line in the progressive image, the interpolated data being filtered pixel data along a temporal direction and a spatial direction.

16. An apparatus for converting an interlace image signal to a progressive image signal, the interlace image signal having a first field of pixel data of odd number lines and a second field of pixel data of even number lines, the progressive image signal having a frame of pixel data of odd number lines and even number lines, comprising:

a decision unit configured to calculate a difference of pixel data between a pixel of one field and a corresponding pixel of a previous one field, the one field being the first field and the second field, and to decide whether the pixel of the one field is in a static area or a moving area based on the difference;

a first output unit configured to output, if the pixel of the one field is in the static area, pixel data of the pixel of the one field as pixel data of the same pixel of one line corresponding to the one field in the progressive image; and a second output unit configured to output, if the pixel of the one field is in the moving area, interpolated data of the pixel of the one field as pixel data of the same pixel of one line corresponding to the one field in the progressive image, the interpolated data being filtered pixel data along a temporal direction and a spatial direction.

17. A computer program product comprising: a computer readable program code embodied in said product for causing a computer to convert an interlace image signal to a progressive image signal, the interlace image signal having a first field of pixel data of odd number lines and a second field of pixel data of even number lines, the progressive image signal having a frame of pixel data of odd number lines and even number lines, said computer readable program code comprising:

a first program code to calculate a difference of pixel data between a pixel of one field and a corresponding pixel of a previous one field, the one field being the first field or the second field;

a second program code to decide whether the pixel of the one field is in a static area or a moving area based on the difference;

a third program code to output, if the pixel of the one field is in the static area, pixel data of the pixel of the one field and pixel data of a corresponding pixel of the other field as pixel data of the same pixels of an odd number line and an even number line in the progressive image; and a fourth program code to output, if the pixel of the one field is in the moving area, interpolated data of the pixel of the one field and interpolated data of a corresponding pixel of the other field as pixel data of the same pixels of an odd number line and an even number line in the progressive image, the interpolated data being filtered pixel data along a temporal direction and a spatial direction.

18. A computer program product, comprising:

a computer readable program code embodied in said product for causing a computer to convert an interlace image signal to a progressive image signal, the interlace image signal having a first field of pixel data of odd number lines and a second field of pixel data of even number lines, the progressive image signal having a frame of pixel data of odd number lines and even number lines, said computer readable program code comprising:

a first program code to calculate a difference of pixel data between a pixel of one field and a corresponding pixel of a previous one field, the one field being the first field and the second field;

a second program code to decide whether the pixel of the one field is in a static area or a moving area based on the difference;

a third program code to output, if the pixel of the one field is in the static area, pixel data of the pixel of the one field as pixel data of the same pixel of one line corresponding to the one field in the progressive image; and a fourth program code to output, if the pixel of one field is in the moving area, interpolated data of the pixel of the one field as pixel data of the same pixel of one line corresponding to the one field in the progressive image, the interpolated data being filtered pixel data along a temporal direction and a spatial direction.

19. A method for converting an interlace image having a first and second field images into a progressive image having a frame image, comprising:

receiving a series of pixel data of the first and second field images;

calculating a first interpolated pixel data from a pair of neighboring pixel data in the first field image;

calculating a difference of the first interpolated pixel data and a corresponding pixel data in the second field image; and generating a first frame pixel data for the frame image by interpolating the first interpolated pixel data and the corresponding pixel data in the second field image when the difference is larger than a threshold value, wherein the first frame pixel data is obtained from the corresponding pixel data in the second field image when the difference is not larger than the threshold value.

20. The method according to claim 19, further comprising:

calculating a second interpolated pixel data from the corresponding pixel data and its neighboring pixel data in the second field image; and generating a second frame pixel data for the frame image by interpolating the second interpolated pixel data and one of the pair of neighboring pixel data in the first field image when the difference is larger than the threshold value, wherein the second frame pixel data is obtained from the one of the pair of neighboring pixel data in the first field image when the difference is not larger than the threshold value.

* * * * *